(12) United States Patent
e Silva et al.

(10) Patent No.: US 9,847,018 B2
(45) Date of Patent: Dec. 19, 2017

(54) SYSTEM AND METHOD FOR APPLYING OVER THE AIR UPDATES TO A UNIVERSAL REMOTE CONTROL DEVICE

(71) Applicant: Ray Enterprises LLC, Wilmington, DE (US)

(72) Inventors: Bernardo Ferreira de Carvalho e Silva, Brooklyn, NY (US); Daniel Cristiano Rocha, Sao Paulo (BR); David Skokna, Brooklyn, NY (US)

(73) Assignee: Ray Enterprises, LLC, Wilmington, DE (US)

( * ) Notice: Subject to any disclaimer, the term of this patent is extended or adjusted under 35 U.S.C. 154(b) by 0 days.

(21) Appl. No.: 14/744,177

(22) Filed: Jun. 19, 2015

(65) Prior Publication Data

US 2015/0371532 A1    Dec. 24, 2015

Related U.S. Application Data

(60) Provisional application No. 62/014,952, filed on Jun. 20, 2014.

(51) Int. Cl.
| | |
|---|---|
| *G05B 11/00* | (2006.01) |
| *G08C 17/02* | (2006.01) |
| *G08C 23/04* | (2006.01) |
| *H04N 21/433* | (2011.01) |
| *H04N 21/45* | (2011.01) |
| *H04N 5/44* | (2011.01) |

(Continued)

(52) U.S. Cl.
CPC ............ *G08C 17/02* (2013.01); *G08C 23/04* (2013.01); *H04N 5/4403* (2013.01);
(Continued)

(58) Field of Classification Search
CPC . G06F 1/32; G06F 1/3212; G06F 8/65; G06F 9/445; G06F 9/46
(Continued)

(56) References Cited

U.S. PATENT DOCUMENTS

| | | |
|---|---|---|
| 6,151,643 A | 11/2000 | Cheng et al. |
| 6,237,091 B1 | 5/2001 | Firooz et al. |

(Continued)

OTHER PUBLICATIONS

Christina Warren, "How to Get Apple's First Over-the-Air iOS Update", Mashable, Nov. 10, 2011, http://mashable.com/2011/11/10/ios5-ota-faq/#S.E5YIDLqkqm.*

*Primary Examiner* — Carlos E Garcia
(74) *Attorney, Agent, or Firm* — Eversheds Sutherland (US) LLP (57) ABSTRACT

A method and system for applying over the air updates to a universal remote control device. The method and system include determining a group associated with the universal remote control based on a remote profile stored on at least one of: a memory of the universal remote control device, and a universal remote database hosted on an external server infrastructure. The method and system also include determining an over the air update that is applicable to the universal remote control device based on the group that is associated with the universal remote control device. The method and system additionally include determining a power level of a battery of the universal remote control device. The method and system further include applying the over the air update that is applicable to the universal remote control device based on the power level of the battery of the universal remote control device.

20 Claims, 4 Drawing Sheets

(51) Int. Cl.

| | |
|---|---|
| *H04N 5/445* | (2011.01) |
| *H04N 21/258* | (2011.01) |
| *H04N 21/431* | (2011.01) |
| *H04N 21/482* | (2011.01) |
| *H04N 21/422* | (2011.01) |
| *H04N 21/81* | (2011.01) |
| *H04N 21/458* | (2011.01) |
| *H04N 21/475* | (2011.01) |

(52) U.S. Cl.
CPC ... *H04N 5/44543* (2013.01); *H04N 21/25808* (2013.01); *H04N 21/25891* (2013.01); *H04N 21/42207* (2013.01); *H04N 21/42208* (2013.01); *H04N 21/42224* (2013.01); *H04N 21/42225* (2013.01); *H04N 21/42226* (2013.01); *H04N 21/4312* (2013.01); *H04N 21/4316* (2013.01); *H04N 21/4331* (2013.01); *H04N 21/4532* (2013.01); *H04N 21/4586* (2013.01); *H04N 21/475* (2013.01); *H04N 21/4821* (2013.01); *H04N 21/4826* (2013.01); *H04N 21/8186* (2013.01); *G08C 2201/10* (2013.01); *G08C 2201/20* (2013.01); *G08C 2201/21* (2013.01); *G08C 2201/30* (2013.01); *G08C 2201/50* (2013.01); *G08C 2201/92* (2013.01); *H04N 2005/443* (2013.01); *H04N 2005/44556* (2013.01)

(58) Field of Classification Search
USPC .................. 340/12.22, 12.23, 12.28
See application file for complete search history.

(56) References Cited

U.S. PATENT DOCUMENTS

| | | | |
|---|---|---|---|
| 6,957,073 B2* | 10/2005 | Bye .................. | H04M 1/72572 340/990 |
| 7,480,907 B1* | 1/2009 | Marolia .................. | G06F 8/65 717/127 |
| 7,496,910 B2 | 2/2009 | Voskuil | |
| 7,570,975 B2* | 8/2009 | Oprescu-Surcobe ............ | H04W 52/0225 340/7.32 |
| 8,019,725 B1 | 9/2011 | Mulligan et al. | |
| 8,634,819 B2 | 1/2014 | Mauer et al. | |
| 8,838,635 B2 | 9/2014 | Mulligan et al. | |
| 9,112,838 B2* | 8/2015 | Wallace, Jr. ...... | G06F 17/30899 |
| 9,672,022 B2* | 6/2017 | Evans ........................ | G06F 8/65 |
| 2003/0234737 A1* | 12/2003 | Nelson ................... | G08C 19/28 341/176 |
| 2004/0002367 A1* | 1/2004 | Chanut ..................... | G06F 8/61 455/574 |
| 2004/0093597 A1 | 5/2004 | Rao et al. | |
| 2008/0129578 A1* | 6/2008 | Petersen ................. | E04H 4/148 341/176 |
| 2008/0197987 A1* | 8/2008 | King ....................... | B60R 25/24 340/426.36 |
| 2009/0023435 A1 | 1/2009 | Kuivalainen | |
| 2009/0164823 A1* | 6/2009 | Aaltonen ........... | G01R 31/3648 713/340 |
| 2011/0283314 A1* | 11/2011 | Tang .................. | H04N 21/4143 725/37 |
| 2011/0321028 A1* | 12/2011 | Evans ....................... | G06F 8/68 717/170 |
| 2012/0233478 A1* | 9/2012 | Mucignat ............. | H04L 12/2825 713/320 |
| 2013/0069769 A1* | 3/2013 | Pennington ............ | G08C 17/02 340/12.28 |
| 2013/0232189 A1* | 9/2013 | Lewis .................... | G06Q 30/02 709/203 |
| 2014/0173577 A1 | 6/2014 | Mitchell et al. | |
| 2014/0237476 A1* | 8/2014 | Steffen .................... | G06F 9/505 718/103 |
| 2015/0007161 A1* | 1/2015 | Yagi ........................ | G06F 8/665 717/171 |
| 2015/0194048 A1* | 7/2015 | Haubrich ............... | G08C 17/02 340/12.5 |

* cited by examiner

SYSTEM AND METHOD FOR APPLYING OVER THE AIR UPDATES TO A UNIVERSAL REMOTE CONTROL DEVICE

BACKGROUND

This disclosure is related to providing over the air updates to a universal remote control device. In general, the universal remote control device is an electronic device for remotely controlling the operation of one or more devices (machines) such as a television. The one or more devices are often manufactured by one or more manufactures and can include separate interfaces controlled by the universal remote control device. Additionally, the universal remote control device can be programmed to control devices that are influenced by service providers, manufacturers, and/or users in order to provide specific and/or customized controls. Therefore, software and/or firmware of the universal remote control devices need to be updated periodically according to the requirements of the various service providers, manufacturers, and/or users in order for the full capabilities of the universal remote control devices to be realized.

BRIEF DESCRIPTION

In view of the foregoing, a computer-implemented method for applying over the air updates to a universal remote control device is provided. The method includes determining a group associated with the universal remote control device based on a remote profile stored on at least one of: a memory of the universal remote control device, and a universal remote database hosted on an external server infrastructure. The method also includes determining an over the air update that is applicable to the universal remote control device based on the group that is associated with the universal remote control device. The method additionally includes determining a power level of a battery of the universal remote control device. The method further includes applying the over the air update that is applicable to the universal remote control device based on the power level of the battery of the universal remote control device.

According to a further aspect, a system for applying over the air updates to a universal remote control device is provided. The system includes a remote control updater utility that is executed by a control unit of the universal remote control device. The system also includes a group determinant module that is included as a module of the remote control updater utility that determines a group associated with the universal remote control device based on a remote profile stored on at least one of: a memory of the universal remote control device, and a universal remote database hosted on an external server infrastructure. The system additionally includes an update determinant module that is included as a module of the remote control updater utility that determines an over the air update that is applicable to the universal remote control device based on the group that is associated with the universal remote control device. The system further includes a battery power level determinant module that is included as a module of the remote control updater utility that determines a power level of the battery of the universal remote control device. Additionally, the system includes an update application module that is included as a module of the remote control updater utility that applies the over the air update that is applicable to the universal remote control device based on the power level of the battery of the universal remote control device.

According to still another aspect, a computer readable storage medium storing instructions that, when executed by a processor, perform actions, including determining a group associated with the universal remote control device based on a remote profile stored on at least one of: a memory of the universal remote control device, and a universal remote database hosted on an external server infrastructure. The instructions also include determining an over the air update that is applicable to the universal remote control device based on the group that is associated with the universal remote control device. The instructions additionally include determining a power level of a battery of the universal remote control device. The instructions further include applying the over the air update that is applicable to the universal remote control device based on the power level of the battery of the universal remote control device.

DETAILED DESCRIPTION

The following includes definitions of selected terms employed herein. The definitions include various examples and/or forms of components that fall within the scope of a term and that can be used for implementation. The examples are not intended to be limiting.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "control unit" and/or "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "database", as used herein can refer to table, a set of tables, a set of data stores and/or methods for accessing and/or manipulating those data stores. Some databases can be incorporated with a disk.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Figure 1:
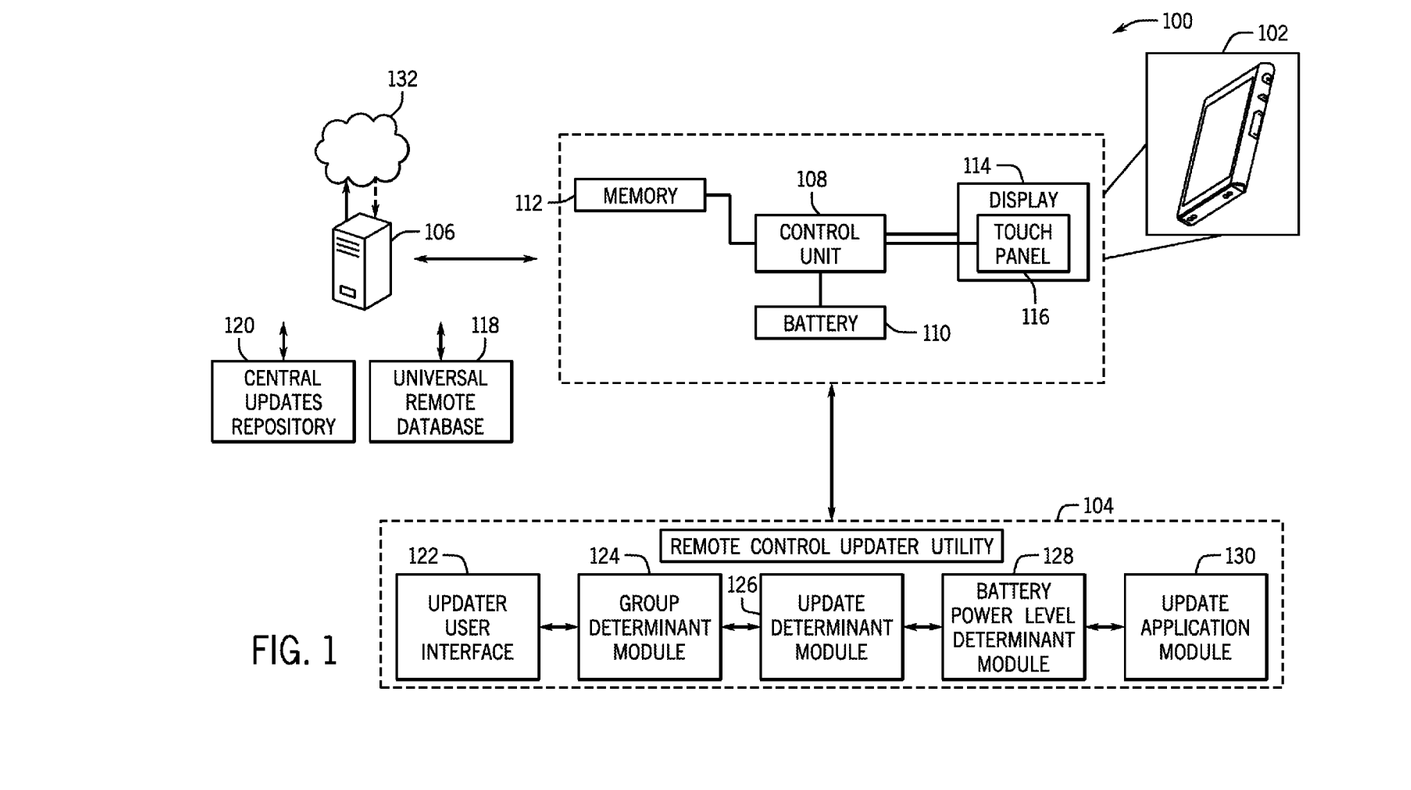
FIG. 1 is a schematic view of an operating environment for implementing systems and methods for providing over the air updates to a universal remote control device according to an exemplary embodiment.

Referring now to the drawings, wherein the showings are for purposes of illustrating one or more exemplary embodiments and not for purposes of limiting same, FIG. 1 is a schematic view of an operating environment 100 for implementing systems and methods for providing one or more over the air updates to a universal remote control device 102 according to an exemplary embodiment. In an exemplary embodiment, the environment 100 can be utilized to execute one or more over the air updates to the universal remote control device 102 in the form of software and firmware updates. The components of the environment 100, as well as the components of other systems, hardware architectures, and software architectures discussed herein, can be combined, omitted, or organized into different architectures for various embodiments.

As shown in FIG. 1, the environment 100 provides an overview showing the communications and data transfers between the universal remote control device 102 that executes a remote control updater utility 104, and an external server infrastructure 106 that includes one or more external servers that can be accessed via an internet cloud 132. The remote control updater utility 104 can provide a decision logic for applying one or more over the air updates to the universal remote control device 102.

In one embodiment, the over the air update(s) can specifically include one or more software and/or firmware updates that are provided in the form of one or more executable data files that are stored on the external server infrastructure 106. Specifically, the over the air update(s) can include one or more firmware updates that can be executed to update the hardware of the universal remote control device 102 and one or more software updates in the form of operating system (version or bug fixing) updates and/or application (version or bug fixing) updates. The over the air update(s) can be applied based on one or more groups that are included within a remote profile associated with the universal remote control device 102.

With continued reference to FIG. 1, the universal remote control device 102 can include various components. In the embodiment of FIG. 1, the universal remote control device 102 can include a control unit 108. The control unit 108 can include a processor and other control circuitry in order to control the various components of the universal remote control device 102. In one or more embodiments, the control unit 108 can execute one or more utilities, operating systems, and/or applications that can be utilized and/or hosted on the universal remote control device 102.

In one or more embodiments, the control unit 108 can be operably connected to a battery 110 that powers the universal remote control device 102 and its various components. The battery 110 can be provided in the form of a rechargeable battery that is connected to the control unit 108. In an exemplary embodiment, the universal remote control device 102 can include a charging base (not shown) that is configured to receive the universal remote control device 102 in order to charge the battery 110.

In some embodiments, the control unit 108 can execute a battery management utility (not shown) that can determine and manage the power level of the battery 110. The battery management utility can be utilized to control the output power of the battery based on a determined amount of usage of the universal remote control device 102 at a given point in time. For example, the battery management utility can put the universal remote control device in a sleep state in order to decrease the output of the battery 110 when the user sets the universal remote control device 102 on a surface for a predetermined period of time without utilizing the universal remote control device 102.

The control unit 108 can also be connected to and associated with a memory 112, which can include volatile memory and/or non-volatile memory as described in detail above. The memory 112 can store one or more data files associated to one or more operating systems, applications, and/or utilities that are executed by the control unit 108 in order to operate the universal remote control device 102 and/or one or more features of the universal remote control device 102. For example, the remote control updater utility 104 and the battery management utility can be stored within the memory 112 in order to be executed by the control unit 108. As described below, the memory 112 can also store a remote profile (not shown) associated with the universal remote control device 102 that can be utilized to determine one or more over the air updates are to be applied to the universal remote control device 102. Additionally, as described below, the memory 112 can also store one or more over the air updates in the form of one or more data files that are wirelessly transferred from the external server infrastructure 106.

The universal remote control device 102 can also include a display 114 that can be associated with a touch panel 116. In one embodiment, the display 114 is larger than typical displays on common electronic handheld devices. In the illustrated embodiment, the display 114 has an aspect ratio of 21:9. The touch panel 116 can be utilized by a user to provide one or more touch inputs to one or more graphical user interfaces that are presented on the display 114. The one or more graphical user interfaces (not all shown) can be associated with the one or more operating systems, applications, and/or utilities that are executed by the control unit 108 from the memory 112.

The universal remote control device 102 is configured for wireless connectivity using various protocols to send/receive electronic signals to/from the universal remote control device 102. For example, the universal remote control device 102 can include a communication unit (not shown) that is operably connected for computer communication to facilitate data input and output between the universal remote control device 102, one or more connected devices, and/or the internet cloud 132. For instance, the communication unit can be utilized to connect to a local area network or a wide area network in order to access the internet cloud 132 via IR, Wi-Fi, Bluetooth, ZigBee, and/or Z-Wave wireless protocols to connect to the external server infrastructure 106.

The universal remote control device can include a corresponding device identification (ID) that can be stored in the memory 112 of the universal remote control device 102. The device ID can include an alpha-numeric unique identifier including, but not limited to, the serial number of the universal remote control device 102, a media access control (MAC) address of the communication unit of the universal remote control device 102, and any other hardcoded alpha-numeric unique identifier that identifies the model/version of the universal remote control device 102.

In one or more embodiments, the external server infrastructure 106 can include a plurality of interconnected servers that support and maintain data that can be sent to the universal remote control device 102 and/or received from the universal remote control device 102. The external server infrastructure 106 can include, but is not limited to, web servers, data servers, database servers, domain controllers, backup servers, and the like. In an exemplary embodiment, the external server infrastructure 106 can include a universal remote database 118. As explained in more detail below, in one embodiment, the universal remote database 118 can store the remote profile associated with the universal remote control device 102 in the form of a database record.

The external server infrastructure 106 can also include a central updates repository 120. The central updates repository 120 can store one or more executable data files that can be uploaded to the universal remote control device 102 or downloaded from the universal remote control device 102 to be applied to update the software (e.g., operating system, application(s)) and/or firmware of the universal remote control device 102. In one embodiment, the manufacturer of the universal remote control device 102, can access the central updates repository 120 on the external server infrastructure 106 in order to store respective software and/or firmware updates on the central updates repository 120 to be accessed by the remote control updater utility 104. In another embodiment, one or more service providers, and/or one or more manufactures of the connected devices can also access the central updates repository 120 in order to store respective software and/or firmware updates on the central updates repository 120.

In an exemplary embodiment, the remote control updater utility 104 can be stored on the memory 112 of the universal remote control device 102 to be executed by the control unit 108 locally. In another embodiment, the remote control updater utility 104 can be a remote utility that is stored on the external server infrastructure 106 and accessed by the universal remote control device 102. The remote control updater utility 104 can include various modules, discussed in detail below.

In an exemplary embodiment, the remote control updater utility 104 includes an updater user interface 122. The updater user interface 122 can be presented to the user on the display 114 of the universal remote control device 102. In an exemplary embodiment, the updater user interface 122 can provide one or more user interface menus and/or icons that can be utilized by the user of the universal remote control device 102 to complete software and/or firmware updates per the user's discretion.

In one embodiment, the updater user interface 122 can also be utilized by the user of the universal remote control device 102 to create or update the remote profile associated with the universal remote control device 102. In one embodiment, when the user initially creates the remote profile through the updater user interface 122, the remote control updater utility 104 can access the memory 112 in order to create the remote profile in the form of a data file that is associated with the universal remote control device 102. As discussed below, the remote profile of the universal remote control device 102 can be updated with data that reflects one or more groups that are associated with the universal remote control device 102.

In an alternate embodiment, when the user initially creates the remote profile through the updater user interface 122, the remote control updater utility 104 can access the universal remote database 118 on the external server infrastructure 106 via the internet cloud 132. Upon accessing the universal remote database 118, the remote control updater utility 104 can determine the device ID of the universal remote control device 102. Upon determining the device ID of the universal remote control device 102, the remote control updater utility 104 can create the remote profile (in the form of a database record) associated with the device ID of the universal remote control device 102 within the universal remote database 118. In an exemplary embodiment, the one or more groups that are associated with the universal remote control device 102 and are updated within the remote profile can include, but are not limited to, a user group, a location group, a service provider group, a connected device group, and/or a software/hardware version group. The user group can include one or more user preferences that are indicative of user remote preferences and/or device programming preferences. The location group can include data that is indicative of the location (e.g. zip code) where the universal remote control device 102 is being used. The service provider group can include data that is indicative of one or more service providers (e.g., satellite television provider, cable television provider, internet video streaming provider, etc.) whose interfaces are being controlled by the universal remote control device 102. The connected device group can include data indicative of one or more connected devices (e.g., television, digital video recorder, digital video disc player, audio player, etc.) that can be connected to and/or controlled by the universal remote control device 102. Additionally, the software/hardware version group can include data pertaining the device ID (e.g., serial number) of the universal remote control device 102 that is indicative of the model/version of the universal remote control device 102 and a list of applications and associated versions of the applications installed on the universal remote control device 102.

In one or more embodiments, the remote control updater utility 104 can automatically update the remote profile with the software/hardware group data in order for the remote control updater utility 104 to determine if any over the air update(s) is to be applied to the universal remote control device 102 based on the model/version of the universal remote control device 102 and/or operating system of the universal remote control device 102.

In one or more embodiments, the user can utilize the updater user interface 122 to populate group data pertaining to the user group, the location group, the service provider group, and/or the connected device group. In an exemplary embodiment, the remote control updater utility 104 can execute a remote profile creation/update mode that either allows the user to update the groups associated with the universal remote control device 102 and/or can automatically update the groups associated with the universal remote control device 102. When the remote control updater utility 104 is put into the remote profile creation/update mode, the updater user interface 122 can include user updatable data fields that are linked with one or more of the groups. In other words, the user updatable data fields can be linked to one or more groups so that when the data fields are updated by the user, respective groups within the remote profile (residing on the memory 112 and/or the universal remote database 118) are updated with corresponding data.

In one embodiment, the user can input data into one or more fields that are associated with the user group that can be updated with one or more user preferences that are indicative of the user remote preferences and/or device programming preferences. The remote preferences and/or device programming preferences can be utilized to determine if one or more over the air updates are to be applied to the universal remote control device 102 based on the user's arbitrary preferences. For example, the user can provide device programming preferences in the form of television viewing preferences that indicate that the user is interested in sports programming. The device programming preferences can be utilized to determine and apply over the air software updates that can pertain to one or more sports related graphical user interfaces that are presented to the user on the display 114. In an alternate embodiment, one or more utilities and/or applications executed by the control unit 108 can be utilized to learn one or more user preferences based on the user's utilization of the universal remote control device 102 in order to automatically populate the user group. The one or more utilities and/or applications can communicate the user's preferences to the remote control updater utility 104 in order to automatically update the user group with the one or more preferences.

In one embodiment, the user can input data into one or more fields that are associated with the location group. For instance, the updater user interface 122 can present the user with one or more address fields allowing the user to update the address where the universal remote control device 102 is being used. In an alternate embodiment, the remote control updater utility 104 can communicate with the communication unit in order to determine the zip code where the universal remote control device 102 is being used through an IP address associated with the universal remote control device 102 in order to automatically update the location group. As discussed below, the location group can be utilized by the remote control updater utility 104 in order to determine and apply one or more over the air updates that apply to the location (e.g., city, state, zip code) where the universal remote control device 102 is being used in order to provide location specific operating system, software, and/or firmware updates.

In one embodiment, the user can input fields on the updater user interface 122 that are associated with the service provider group. For instance, the updater user interface 122 can present the user with one or more fields that can be input with information regarding one or more service providers (e.g., satellite television provider, cable television provider, internet video streaming provider, etc.) In one embodiment, the updater user interface 122 can present the user with a table of national and/or local service providers (based on the location determined by the location group) that can be utilized to input one or more service provider codes within the fields associated with the service provider group. In another embodiment, the remote control updater utility 104 can determine one or more service providers based off of one or more control codes that are utilized by the universal remote control device 102 to control one or more devices associated with specific service providers in order to automatically update the service provider group. As discussed below, the service provider group can be utilized by the remote control updater utility 104 in order to determine and apply one or more over the air updates that pertain to one or more specific service providers in order to provide service provider specific operating system, software, and/or firmware updates.

In one embodiment, the user can input fields on the updater user interface 122 that are associated with the connected device group. For instance, the updater user interface 122 can present the user with one or more fields that can be input with information pertaining to one or more connected devices (e.g., television make/model/version, digital video recorder make/model/version, digital videodisc player make/model/version, audio player make/model/version, etc.) In one embodiment, the updater user interface 122 can present the user with a table of devices that can be utilized to input one or more device codes within the fields associated with the connected device group. In another embodiment, the remote control updater utility 104 can determine one or more connected devices based off of one or more control codes that are utilized by the universal remote control device 102 to control one or more connected devices in order to automatically update the connected device group. As discussed below, the connected device group can be utilized by the remote control updater utility 104 in order to determine and apply over the air updates that pertain to one or more specific connected devices in order to provide operating system, software, and/or firmware updates associated to the one or more connected devices.

In an exemplary embodiment, upon the user updating the fields on the update user interface, the remote control updater utility 104 can access the remote profile on the memory 112 of the universal remote control device 102 to update the groups within the remote profile. In an alternate embodiment, the remote control updater utility 104 can access the universal remote database 118 on the external server infrastructure 106 in order to update the remote profile with the groups. As will be described below, upon updating the remote profile, the remote control updater utility 104 can determine one or more over the air updates to be applied based on the groups extracted from the remote profile. Additionally, as described below, the remote control updater utility 104 can receive battery monitoring data from the above mentioned battery management utility to determine if the battery has a sufficient power level in order to apply the one or more specific over the air software and/or firmware updates to the universal remote control device 102.

II. The Remote Control Updater Utility and Related Methods

Figure 2:
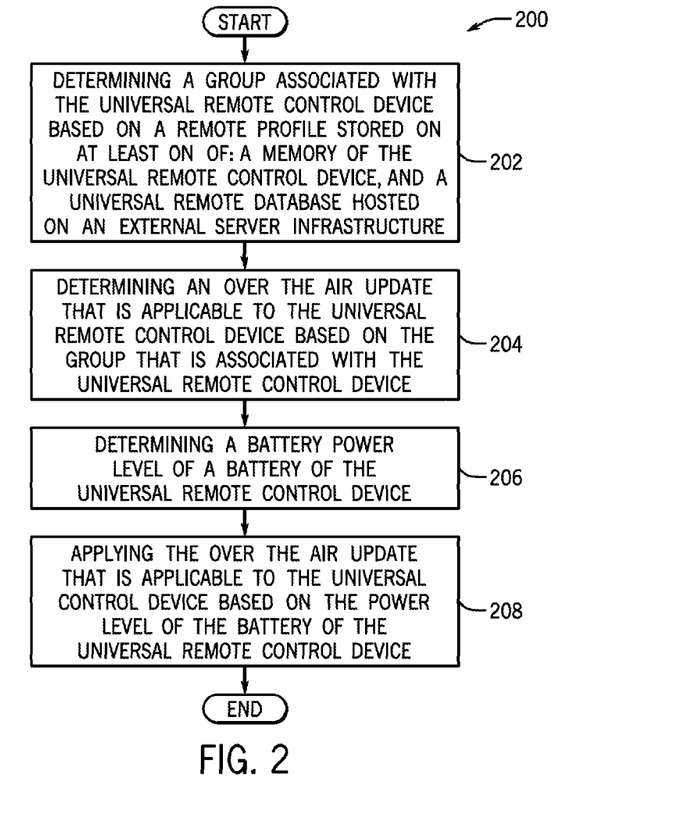
FIG. 2 is a process flow diagram of a method for applying over the air updates to a universal remote control device executed by a remote control updater utility from the operating environment of FIG. 1.

Referring now to FIG. 2, a process flow diagram of a method 200 for applying over the air updates to a universal remote control device 102 executed by the remote control updater utility 104 from the operating environment of FIG. 1 according to an exemplary embodiment. FIG. 2 will be described with reference to the components of FIG. 1, though it is to be appreciated that the method of FIG. 2 can be used with other systems/components. The method 200 can be executed by the remote control updater utility 104 through a plurality of modules that include a group determinant module 124, an update determinant module 126, a battery power level determinant module 128, and an update application module 130. It is to be appreciated that the method 200 can be executed automatically within a predetermined timeframe (e.g., every six hours) or manually based on the user's input on a user interface input button (icon) that can be inputted to apply the one or more over the air updates provided on the user interface 122. It is also to be appreciated that the method 200 can occur silently (i.e., the over the air update(s) can be executed in the background without any apparent affect on the performance of the universal remote control device 102) without any presentation of user interfaces, menus, and/or restarting of the universal remote control device 102.

At block 202, the method includes determining a group associated with the universal remote control device 102 based on a remote profile stored on at least one of: a memory 112 of the universal remote control device 102, and a universal remote database 118 hosted on an external server infrastructure 106. In one embodiment, the group determinant module 124 can access the memory 112 to access the remote profile associated with the universal remote control device 102. In an alternate embodiment, the group determinant module 124 can access the universal remote database 118 on the external server infrastructure 106 via the internet cloud 132 to determine the remote profile associated with the universal remote control device 102 through its device ID.

Upon accessing the remote profile associated with the universal remote control device 102, the group determinant module 124 can evaluate the remote profile in order to determine one or more user groups that can include the user group, the location group, the service provider group, the connected device group, and/or the software/hardware version group. Specifically, upon evaluating the remote profile, the group determinant module 124 can extract data from the groups (e.g., user preferences, zip code, service provider(s), connected device(s), installed application versions, device ID) and can further communicate the extracted data to the update determinant module 126.

Figure 3:
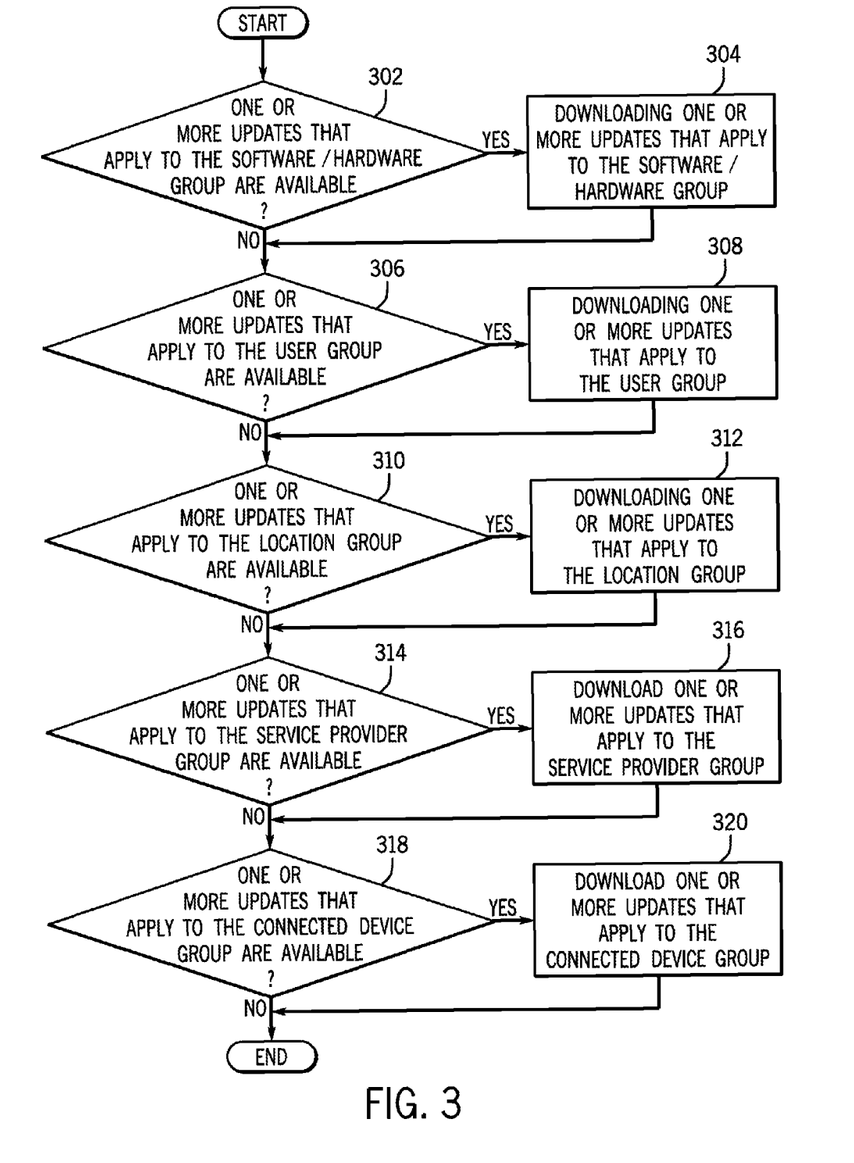
FIG. 3 is a process flow diagram of a method for determining an over the air update that is applicable to the universal remote control device based on the group that is associated with the universal remote control device from the operating environment of FIG. 1.

At block 204, the method includes determining an over the air update that is applicable to the universal remote control device 102 based on the group that is associated with the universal remote control device. Referring now to FIG. 3, a process flow diagram of a method 300 for determining an over the air update that is applicable to the universal remote control device 102 based on the group that is associated with the universal remote control device 102 from the operating environment of FIG. 1 according to an exemplary embodiment. FIG. 3 will be described with reference to the components of FIG. 1, though it is to be appreciated that the method of FIG. 3 can be used with other systems/components. In the method of FIG. 3, a specific order of determining if updates are available based on specific group data, however, it is understood that the method and systems described herein can determine if updates are available in any order. Additionally, in the method 300 of FIG. 3, one or more updates are downloaded to the universal remote control device 102 based on specific group data, however, it is understood that the method and systems described herein can include one or more updates that are uploaded from the universal remote control device 102 based on specific group data. In an exemplary embodiment, upon receiving the extracted data from one or more groups from the group determinant module 124, the update determinant module 126 can further evaluate the extracted data in order to execute the method 300.

At block 302, the method includes determining if one or more updates that apply to the software/hardware group are available. In an exemplary embodiment, upon receiving the extracted data provided by the group determinant module 124, the update determinant module 126 can evaluate the extracted data pertaining to the software/hardware group. The extracted data can include the device ID of the universal remote control device 102 that is indicative of the model/version of the universal remote control device 102 and a list of applications and associated versions of the applications installed on the universal remote control device 102. In one embodiment, upon evaluating the data pertaining to the software/hardware group, the update determinant module 126 can access the external server infrastructure 106 through the internet cloud 132 to query the central updates repository 120 for one or more applicable updates that are based on the model/version of the universal remote control device 102, the operating system executed on the universal remote control device 102, and/or one or more applications executed on the universal remote control device 102. In one embodiment, the update determinant module 126 can evaluate the list of applications and associated versions of the applications installed on the universal remote control device 102 included within the software/hardware group to determine if newer (more recent) updates of the application are included within the central updates repository 120.

If it is determined that one or more updates that apply to the software/hardware group are available (at block 302), at block 304, the method includes downloading one or more updates that apply to the software/hardware group. In one embodiment, upon determining that one or more updates are available based on the software/hardware group, the update determinant module 126 can download the one or more applicable software and/or firmware updates in the form of one or more executable data files that are downloaded over the air to the memory 112 of the universal remote control device 102. As will be described in more detail below, the one or more applicable software and/or firmware updates pertaining to the software/hardware group can then be stored on the memory 112 to be applied based on the power level of the battery of the universal remote control device 102. In an alternate embodiment, upon determining that one or more updates are available based on the software/hardware group, the update determinant module 126 can create/update (an already existing) update marker file (update marker) on the memory 112 that can indicate one or more specific over the air updates that are to be downloaded and applied (i.e., executed) directly from the central updates repository 120. Specifically the update marker can include a data file that can include details regarding the one or more over the air updates and the location of the one or more over the air updates on the central updates repository 120.

If it is determined that one or more updates that apply to the software/hardware group are not available (at block 302), at block 306, the method includes determining if one or more updates that apply to the user group are available. In one embodiment, the update determinant module 126 can evaluate the extracted data pertaining to the user group that includes one or more user preferences that are indicative of user remote preferences and/or device programming preferences. The remote preferences and/or device programming preferences can be utilized to determine if one or more over the air software updates are to be applied to the universal remote control device based on the user's arbitrary preferences.

In one embodiment, upon evaluating the data pertaining to the user group, the update determinant module 126 can access the external server infrastructure 106 through the internet cloud 132 to check for one or more applicable updates that are available on the central updates repository 120 that are related to the one or more user preferences. In other words, the update determinant module 126 can query the central updates repository 120 for one or more software and/or firmware updates that pertain to one or more user preferences. As an illustrative example, if the user inputs preferences that are included within the user group regarding specific button configurations that he/she would like the universal remote control device 102 to present via the display 114, the update determinant module 126 can query the central updates repository 120 to determine if one or more updates are available that are applicable to the user's preferred button configurations.

If it is determined that one or more updates that apply to the user group are available (at block 306), at block 308, the method includes downloading one or more updates that apply to the user group. In one embodiment, upon determining that one or more updates are available based on the user group, the update determinant module 126 can download the one or more applicable software and/or firmware updates in the form of one or more executable data files that are downloaded over the air to the memory 112 of the universal remote control device 102. As will be described in more detail below, the one or more applicable software and/or firmware updates pertaining to the user group can then be stored on the memory 112 to be applied based on the power level of the battery 110 of the universal remote control device 102. In an alternate embodiment, upon determining that one or more updates are available based on the user group, the update determinant module 126 can create/update the update marker on the memory 112 that can indicate one or more specific over the air updates that are to be downloaded and applied directly from the central updates repository 120.

If it is determined that one or more updates that apply to the user group are not available (at block 306), at block 310, the method includes determining if one or more updates that apply to the location group are available. In one embodiment, the update determinant module 126 can evaluate the extracted data pertaining to the location group that is indicative of the location (e.g. zip code) where the universal remote control device 102 is being used. In one embodiment, upon evaluating the extracted data pertaining to the location group the update determinant module 126 can access the external server infrastructure 106 though the internet cloud 132 to check for one or more applicable updates that are available on the central updates repository 120 that are based on the location (e.g., zip code) where the universal remote control device 102 is being used. In other words, the update determinant module 126 can query the central updates repository 120 for one or more software and/or firmware updates that apply to the location (e.g., city, state, zip code) where the universal remote control device 102 is being used to provide location specific operating system, software, and/or firmware updates.

If it is determined that one or more updates that apply to the user group are available (at block 310), at block 312, the method includes downloading one or more updates that apply to the location group. In one embodiment, upon determining that one or more updates are available based on the location group, the update determinant module 126 can download the one or more applicable software and/or firmware updates in the form of one or more executable data files that are downloaded over the air to the memory 112 of the universal remote control device 102. As will be described in more detail below, the one or more applicable software and/or firmware updates pertaining to the location group can then be stored on the memory 112 to be applied based on the power level of the battery 110 of the universal remote control device 102. In an alternate embodiment, upon determining that one or more updates are available based on the location group, the update determinant module 126 can create/update the update marker on the memory 112 that can indicate one or more specific over the air updates that are to be downloaded and applied directly from the central updates repository 120.

If it is determined that one or more updates that apply to the location group are not available (at block 310), at block 314, the method includes determining if one or more updates that apply to the service provider group are available. In one embodiment, the update determinant module 126 can evaluate the extracted data pertaining to the service provider group that is indicative of one or more service providers (e.g., satellite television provider, cable television provider, internet video streaming provider, etc.) whose interfaces and/or devices are being controlled by the universal remote control device 102. In one embodiment, upon evaluating the data pertaining to the service provider group, the update determinant module 126 can access the external server infrastructure 106 though the internet cloud 132 to check for one or more applicable updates based the one or more service providers whose interfaces and/or devices are being controlled by the universal remote control device 102. In other words, the update determinant module 126 can query the central updates repository 120 for one or more software and/or firmware updates that pertain to one or more specific service providers.

If it is determined that one or more updates that apply to the service provider group are available (at block 314), at block 316, the method includes downloading one or more updates that apply to the service provider group. In one embodiment, upon determining that one or more updates are available based on the service provider group, the update determinant module 126 can download the one or more applicable software and/or firmware updates in the form of one or more executable data files that are downloaded over the air to the memory 112 of the universal remote control device 102. As will be described in more detail below, the one or more applicable software and/or firmware updates pertaining to the service provider group can then be stored on the memory 112 to be applied based on the power level of the battery 110 of the universal remote control device 102. In an alternate embodiment, upon determining that one or more updates are available based on the service provider group, the update determinant module 126 can create/update the update marker on the memory 112 that can indicate one or more specific over the air updates that are to be downloaded and applied directly from the central updates repository 120.

If it is determined that one or more updates that apply to the service provider group are not available (at block 314), at block 318, the method includes determining if one or more updates that apply to the connected device group are available. In one embodiment, the update determinant module 126 can evaluate the extracted data pertaining to the connected device group that is indicative of one or more connected devices (e.g., television, digital video recorder, digital video disc player, audio player, etc.) that can be connected to and/or controlled by the universal remote control device 102. In one embodiment, upon evaluating the data pertaining to the connected device group, the update determinant module 126 can access the external server infrastructure 106 though the internet cloud 132 to check for one or more applicable updates based on one or more connected devices that can be connected and/or controlled by the universal remote control device 102. In other words, the update determinant module 126 can query the central updates repository 120 for one or more software and/or firmware updates that pertain to one or more devices that are connected to and/or controlled by the universal remote control device 102.

If it is determined that one or more updates that apply to the connected device group are available (at block 318), at block 320, the method includes downloading one or more updates that apply to the connected device group. In one embodiment, upon determining that one or more updates are available based on the connected device group, the update determinant module 126 can download the one or more applicable software and/or firmware updates in the form of one or more executable data files that are downloaded over the air to the memory 112 of the universal remote control device 102. As will be described in more detail below, the one or more applicable software and/or firmware updates pertaining to the connected device group can then be stored on the memory 112 to be applied based on the power level of the battery 110 of the universal remote control device 102. In an alternate embodiment, upon determining that one or more updates are available based on the connected device group, the update determinant module 126 can create/update the update marker on the memory 112 that can indicate one or more specific over the air updates that are to be downloaded and applied directly from the central updates repository 120.

Referring back to FIG. 2, upon determining an over the air update that is applicable to the universal remote control based on the group that is associated with the universal remote control device (at block 204), at block 206, the method includes determining a power level of a battery 110 of the universal remote control device 102. In one embodiment, the battery power level determinant module 128 of the remote control updater utility 104 can communicate with the battery management utility to determine a current power level of the battery 110. In one embodiment, the battery management utility can provide the current power level of the battery 110 in a numerical percentage value or level that reflects the percentage of power remaining in the battery 110. However, it is to be appreciated that the value can be provided in various formats, as described above.

In one embodiment, the battery power level determinant module 128 can classify the battery 110 as being within a charging state or an operating state based on if the universal remote control device 102 is placed on the charging base to charge the battery 110. In other words, the battery power level determinant module 128 can classify the battery 110 as being within the charging state, when the universal remote control device 102 is determined to be placed on the charging base. When the universal remote control device 102 is not operably/electrically connected to the charging base, the battery power level determinant module 128 can classify the battery 110 as being within the usage state. As will be described in more detail below, the classification of the charging state and the usage state of the battery can be utilized when applying one or more over the air updates. In an exemplary embodiment, the battery power level determinant module 128 can provide data that pertains to the battery level and classification of the battery 110 in the charging state or the usage state to the update determinant module 126.

Figure 4:
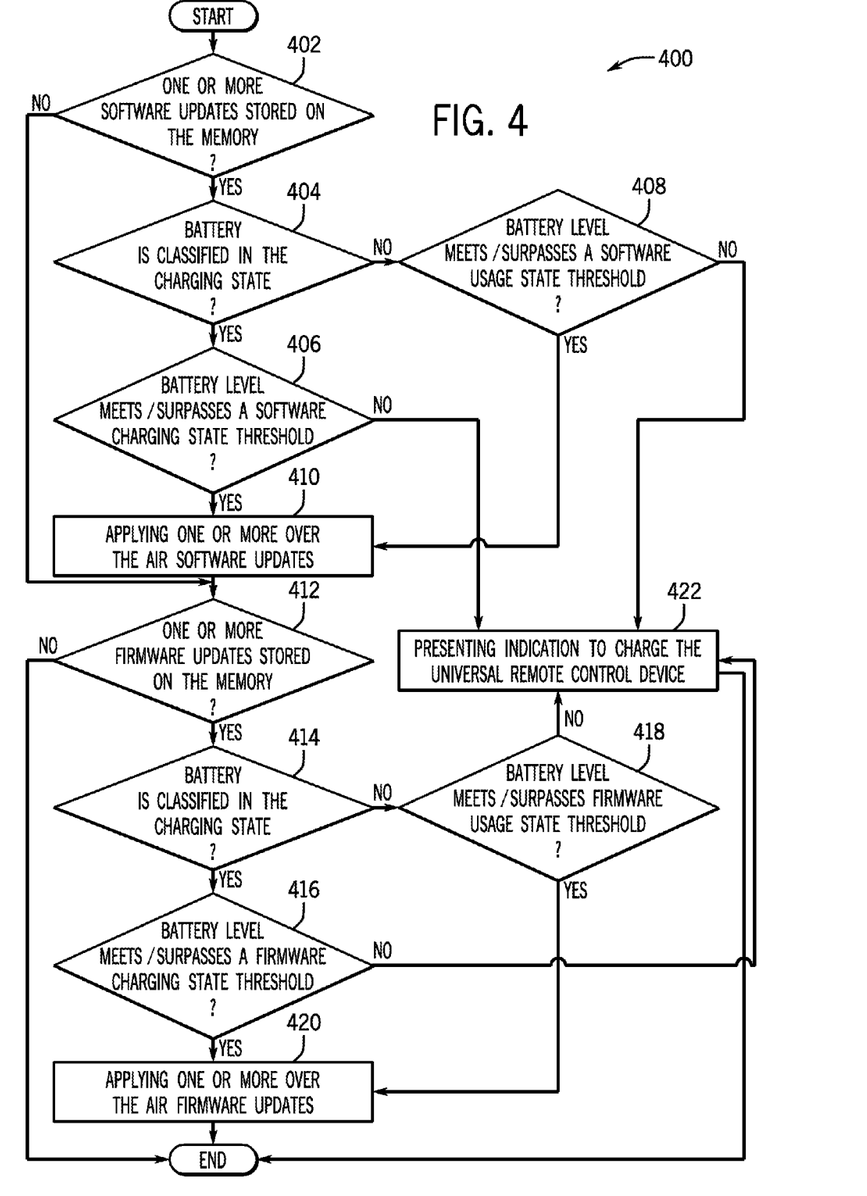
FIG. 4 is a process flow diagram of a method for applying the over the air update that is applicable to the universal remote control device based on the power level of the battery of the universal remote control device from the operating environment of FIG. 1.

At block 208, the method includes applying the over the air update that is applicable to the universal remote control device based on the power level of the battery 110 of the universal remote control device 102. Referring now to FIG. 4, a process flow diagram of a method 400 for applying the over the air update that is applicable to the universal remote control device 102 based on the power level of the battery 110 of the universal remote control device 102 from the operating environment of FIG. 1 according to an exemplary embodiment. FIG. 4 will be described with reference to the components of FIG. 1, though it is to be appreciated that the method of FIG. 4 can be used with other systems/components. In the method of FIG. 4, a specific order of applying updates is presented (i.e., software updates before firmware updates), however, it is understood that the method and systems described herein can apply updates in any order.

At block 402, the method includes determining if one or more software updates are stored on the memory 112. In an exemplary embodiment, the update application module 130 of the remote control updater utility 104 can access the memory 112 of the universal remote control device 102 to determine if one or more over the air software updates are stored on the memory 112. Specifically, as discussed above one or more software updates pertaining to the groups associated with the universal remote control device 102 can be stored on the memory 112 (at blocks 304, 308, 312, 316, and/or 320) to be applied to the universal remote control device 102. In an alternate embodiment, the update application module 130 can access the memory 112 in order to evaluate the update marker that is stored within the memory 112 to determine if one or more software updates that are stored on the central updates repository 120 can be applied to the universal remote control device 102.

If it is determined that one or more software updates are not stored on the memory 112 (at block 402), the method includes determining if one or more firmware updates are stored on the memory at block 412 (discussed in more detail below). However, if it is determined that one or more software updates are stored on the memory 112 (at block 402), at block 404, the method includes determining if the battery 110 is classified in the charging state. As discussed above, the battery power level determinant module 128 can classify the battery 110 as being in a charging state or a usage state. Further, the battery power level determinant module 128 can provide data that pertains to the classification of the battery 110 to the update application module 130.

If it is determined that the battery 110 is classified in the charging state (at block 404), at block 406, the method includes determining if the battery level surpasses a software charging state threshold. As discussed above, the battery power level determinant module 128 can communicate with the battery management utility in order to determine a power level of the battery 110 and can further provide data that pertains to the power level of the battery 110 to the update application module 130. In an exemplary embodiment, the update application module 130 can compare the power level of the battery 110 to the software charging state threshold in order to determine if the battery level of the battery 110 meets or surpasses the threshold. Specifically, the software charging state threshold can include a predetermined power level of the battery 110 (e.g., percentage of remaining battery power) that must be met while the battery 110 is classified within the charging state in order to successfully complete the installation of one or more software updates. For example, the software charging state threshold can be 25% while the universal remote control device 102 is placed on the charging base to charge the battery 110.

If it is determined that the battery is not classified in the charging state (at block 404), at block 408, the method includes determining if the battery level surpasses a software usage threshold. In an exemplary embodiment, the update application module 130 can compare the power level of the battery 110 provided by battery management utility to the software usage state threshold in order to determine if the battery level of the battery 110 meets or surpasses the threshold. Specifically, the software usage state threshold can include a predetermined power level of the battery 110 (e.g., percentage of remaining battery power) that must be met while the battery 110 is classified within the usage state in order to successfully complete the installation of one or more software updates when the battery 110 is not being actively charged. For example, the software usage state threshold can be 50% while the universal remote control device 102 is being utilized off of the charging base.

If it is determined that the battery level does not surpass a software charging state threshold (at block 406) or if it is determined that the battery level does not surpass a software usage state threshold (at block 408), at block 422, the method includes presenting an indication to charge the universal remote control device 102. In one embodiment, the updater user interface 122 can present an indication to the user to continue to charge the universal remote control device 102 or to connect the universal remote control device 102 to the charging base in order for the power level of the battery 110 to be charged to a sufficient amount (i.e., the power level that meets or surpasses the software charging state threshold/software usage state threshold). In some embodiments, if the user continues charge the universal remote control device 102 or connects the universal remote control device 102 to the charging base in order for the power level of the battery 110 to be charged to the sufficient amount (based on the update application module 130 re-executing blocks 404/408), the updater user interface 122 can present the user with a user interface input button (icon) that can be inputted to apply the one or more software updates (at block 410) when the power level of the battery 110 is charged to the sufficient amount.

In the embodiment of FIG. 4, if it is determined that the battery level does not surpass a software charging state threshold (at block 406) or if it is determined that the battery level does not surpass a software usage state threshold (at block 408), the method includes determining if one or more firmware updates are stored on the memory 112 at block 412 (discussed in more detail below). However, it if is determined that the battery level surpasses a software charging state threshold (at block 406) or if it is determined that the battery level surpasses a software usage state threshold (at block 408), at block 410, the method includes applying one or more over the air software updates. In an exemplary embodiment, the update application module 130 can access the memory 112 of the universal remote control device 102 and can execute the one or more software updates (e.g., operating system updates, application updates). In another embodiment, the update application module 130 can directly access the external server infrastructure 106 in order to execute the one or more software updates from the central updates repository 120 that correspond to the update marker stored within the memory 112.

In one or more embodiments, the over the air software update(s) can be provided as a silent update(s) or active update(s). As the silent update(s), the software update(s) can be executed in the background without any apparent affect on the performance of the universal remote control device 102. In other words, as the silent update(s) the software update(s) can run in the background without any necessary user input/interaction and/or restarting of the universal remote control device 102. As the active update(s), the software update(s) can present one or more interfaces and/or user input icons on the updater user interface 122 in order for the user to input customizations. In some embodiments, some active updates can require a restart of the universal remote control device 102. In additional embodiments, some active updates can be paused and restarted by the user through a pause/start user interface input button (icon) that is provided on the updater user interface 122.

In one or more embodiments, the update application module 130 can include a rollback feature that can be utilized to rollback to a previous software version if one or more over the air software updates fail to completely apply to the universal remote control device 102. This functionality ensures that the operating system and/or one or more applications are not corrupted based on the application of one or more partial updates. Specifically, in one embodiment, during the application of the software update(s), the update application module 130 can save one or more executable data files that can be executed to restore the operating system and/or one or more applications to a previous version/state before the application of the update(s) (at block 410).

In an additional embodiment, the update application module 130 can execute the method 400 in order to apply the one or more over the air software updates (at block 410) when the universal remote control device 102 is put within the sleep state. For instance, as described above, during a predetermined period of inactivity, the battery management utility can put the universal remote control device 102 within the sleep state in order to decrease the output of the battery 110 when the user sets the universal remote control device 102 on a surface for a predetermined period of time without utilizing the universal remote control device 102. This functionality ensures that the software update(s) are applied when the battery 110 is least utilized to execute one or more functions based on an active utilization of the device 102 by the user. Additional software update application/execution techniques will be apparent.

At block 412, the method includes determining one or more firmware updates stored on the memory 112. In an exemplary embodiment, the update application module 130 of the remote control updater utility 104 can access the memory 112 of the universal remote control device 102 in order to determine if one or more over the air firmware updates are stored on the memory 112. Specifically, as discussed above one or more firmware updates pertaining to the groups associated with the universal remote control device 102 can be stored on the memory 112 (at blocks 304, 308, 312, 316, and/or 320) to be applied to the universal remote control device 102. In an alternate embodiment, the update application module 130 can access the memory 112 in order to determine the update marker that is stored within the memory 112 in order to determine if one or more firmware updates that are stored on the central updates repository 120 that can be applied to the universal remote control device 102.

If it is determined that one or more firmware updates are stored on the memory 112 (at block 412), at block 414, the method includes determining if the battery 110 is classified in the charging state. As discussed, the battery power level determinant module 128 can classify the battery 110 as being in a charging state or a usage state. Further, the battery power level determinant module 128 can provide data that pertains to the classification of the battery 110 to the update application module 130. If it is determined that the battery 110 is classified in the charging state (at block 414), at block 416, the method includes determining if the battery level surpasses a firmware charging state threshold.

In an exemplary embodiment, the update application module 130 can compare the power level of the battery 110 provided by the battery management utility to the firmware charging state threshold in order to determine if the battery level of the battery 110 meets or surpasses the threshold. Specifically, the firmware charging state threshold can include a predetermined power level of the battery 110 (e.g., percentage of remaining battery power) that must be met while the battery 110 is classified within the charging state in order to successfully complete the installation of one or more firmware updates. For example, the firmware charging state threshold can be 35% while the universal remote control device 102 is placed on the charging base to charge the battery 110.

If it is determined that the battery 110 is not classified in the charging state (at block 414), at block 418, the method includes determining if the battery level surpasses a firmware usage threshold. In an exemplary embodiment, the update application module 130 can compare the power level of the battery 110 provided by battery management utility to the firmware usage state threshold in order to determine if the battery level of the battery 110 meets or surpasses the threshold. Specifically, the firmware usage state threshold can include a predetermined power level of the battery 110 (e.g., percentage of remaining battery power) that must be met while the battery 110 is classified within the usage state in order to successfully complete the installation of one or more firmware updates when the battery 110 is not being actively charged. For example, the firmware usage state threshold can be 60% while the universal remote control device 102 is being utilized off of the charging base.

If it is determined that the battery level does not surpass a firmware charging state threshold (at block 416) or if it is determined that the battery level does not surpass a firmware usage state threshold (at block 418), at block 422, the method includes presenting an indication to charge the universal remote control device 102. In one embodiment, the updater user interface 122 can present the indication to continue to charge the universal remote control device 102 or to connect the universal remote control device 102 to the charging base in order for the power level of the battery 110 to be charged to a sufficient amount (i.e., the power level that meets or surpasses the firmware charging state threshold/firmware usage state threshold). In some embodiments, if the user continues to place/starts to place the universal remote control device 102 on the charging base in order for the power level to the battery 110 to be charged to the sufficient amount, the updater user interface 122 can present the user with a user interface input button (icon) that can be inputted to apply the one or more firmware updates (at block 420) when the power level of the battery 110 is charged to the sufficient amount.

If if is determined that the battery level surpasses a firmware charging threshold (at block 416) or if it is determined that the battery level surpasses a firmware usage state threshold (at block 418), at block 420, the method includes applying one or more over the air firmware updates. In an exemplary embodiment, the update application module 130 can access the memory 112 of the universal remote control device 102 and can execute the one or more firmware updates to the universal remote control device 102. In another embodiment, the update application module 130 can directly access the external server infrastructure 106 in order to execute the one or more firmware updates from the central updates repository 120 that correspond to the update marker stored within the memory 112.

In an additional embodiment, the update application module 130 can execute the method 400 in order to apply the one or more over the air firmware updates (at block 420) when the universal remote control device 102 is put within the sleep state to ensure that the firmware update(s) are applied when the battery 110 is least utilized to execute one or more functions based on an active utilization of the device 102 by the user. Additional firmware update application/execution techniques will be apparent.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also indented to be encompassed by the following claims.

The invention claimed is:

1. A computer-implemented method for applying over the air updates to a universal remote control device, comprising:
    determining location information for the universal remote control device;
    determining a group, wherein the group comprises content service provider data for the universal remote control device, and wherein the group is associated with the universal remote control device based on a remote control profile stored on at least one of: a memory of the universal remote control device, or a database hosted on an external server infrastructure;
    determining an over the air update that is applicable to the universal remote control device based on the group and on the location information for the universal remote control device;
    determining that the universal remote control device is being charged;
    determining a power level of a battery of the universal remote control device; and
    applying the over the air update based on the determination that the universal remote control device is being charged and the power level of the battery of the universal remote control device.

2. The method of claim 1, further including providing an updater user interface on a display of the universal remote control device with user updatable data fields that are linked with the group, receiving data within the user updatable data fields, accessing the remote control profile, and updating the group within the remote control profile with the data received within the user updatable data fields.

3. The method of claim 1, wherein applying the over the air update includes determining that a type of over the air update is a software update, and determining: the power level of the battery meets or surpasses a software charging state threshold, and the power level of the battery meets or surpasses a software usage state threshold when the battery is classified as being in a usage state, wherein the software update includes at least one of: an update of an operating system executed on the universal remote control device, or an update of an application executed on the universal remote control device.

4. The method of claim 1, wherein applying the over the air update includes determining that a type of over the air update is a firmware update, and determining the power level of the battery meets or surpasses a firmware charging state threshold, and the power level of the battery meets or surpasses a firmware usage state threshold when the battery is classified as being in a usage state, wherein the firmware update includes an update of the firmware of the universal remote control device.

5. The method of claim 1, wherein applying the over the air update includes applying the over the air update that includes is at least one of: a silent update or an active update, wherein the silent update is executed without any effect on a performance of the universal remote control device and the active update presents one or more interfaces and user input icons during execution of the update.

6. The method of claim 1, wherein determining the location information for the universal remote control device comprises identifying a zip code where the universal remote control device is operating or an IP address associated with the universal remote control device.

7. The method of claim 1, further comprising determining a user content programming preference, wherein determining the over the air update that is applicable to the universal remote control device is further based on the user content programming preference.

8. The method of claim 1, wherein determining the group associated with the universal remote control device includes extracting data associated with the group from the remote control profile, wherein the group associated with the universal remote control device further comprises at least one of: a user preference, connected device data, or a software/hardware version for the universal remote control device.

9. The method of claim 8, wherein determining the over the air update includes evaluating extracted data pertaining to the group and accessing a central updates repository that is hosted on the external server infrastructure to determine the over the air update that applies to the group.

10. The method of claim 9, wherein determining the over the air update includes downloading the over the air update that applies to the group from the central updates repository hosted on the external server infrastructure to the memory of the universal remote control device.

11. A system for applying over the air updates to a universal remote control device, comprising:
a remote control updater utility executed by a control unit of the universal remote control device, wherein the remote control updater utility determines location information for the universal remote control device;
a group determinant module included as a module of the remote control updater utility that determines:
a group, wherein the group comprises content service provider data for the remote control device, and wherein the group is associated with the universal remote control device based on a remote control profile stored on at least one of: a memory of the universal remote control device, or a database hosted on an external server infrastructure;
an update determinant module included as a module of the remote control updater utility that determines an over the air update that is applicable to the universal remote control device based at least in part on the group and on the location information for the universal remote control device;
a battery power level determinant module included as a module of the remote control updater utility that determines that the universal remote control device is being charged and determines a power level of a battery of the universal remote control device; and
an update application module included as a module of the remote control updater utility that applies the over the air update based on the determination that the universal remote control device is being charged and power level of the battery of the universal remote control device.

12. The system of claim 11, further including the remote control updater utility providing an updater user interface on a display of the universal remote control device with user updatable data fields that are linked with the group, receiving data within the user updatable data fields, accessing the remote control profile, and updating the group within the remote control profile with the data received within the user updatable data fields.

13. The system of claim 11, wherein the update application module determines that a type of over the air update is a software update and determines: the power level of the battery meets or surpasses a software charging state threshold, and the power level of the battery meets or surpasses a software usage state threshold when the battery is classified as being in a usage state, wherein the software update includes at least one of: an update of an operating system executed on the universal remote control device, or an update of an application executed on the universal remote control device.

14. The system of claim 11, wherein the update application module determines that a type of over the air update is a firmware update and determines: the power level of the battery meets or surpasses a firmware charging state threshold, and the power level of the battery meets or surpasses a firmware usage state threshold when the battery is classified as being in a usage state, wherein the firmware update includes an update of the firmware of the universal remote control device.

15. The system of claim 11, wherein the update application module applies the over the air update that includes is at least one of: a silent update and an active update, wherein the silent update is executed without any effect on a performance of the universal remote control device, and the active update presents one or more interfaces and user input icons during execution of the update.

16. The system of claim 11, wherein the group determinant module extracts data associated with the group from the remote control profile, wherein the group associated with the universal control remote control device further comprises at least one of: a user preference, connected device data, or a software/hardware version for the universal remote control device.

17. The system of claim 16, wherein the update determinant module evaluates extracted data associated with the group and accesses a central updates repository that is hosted on the external server infrastructure to determine the over the air update that applies to the group.

18. The system of claim 17, wherein the update determinant module downloads the over the air update that applies to the group from the central updates repository hosted on the external server infrastructure to the memory of the universal remote control device.

19. A non-transitory computer-readable storage medium storing instructions that, when executed by a computer, causes the computer to perform a method, comprising:

determining location information for a universal remote control device;

determining a group, wherein the group comprises content service provider data for the universal remote control device, and wherein the group is associated with the universal remote control device based on a remote control profile stored on at least one of: a memory of the universal remote control device, or a universal remote database hosted on an external server infrastructure;

determining an over the air update that is applicable to the universal remote control device based at least in part on the group and on the location information for the universal remote control device;

determining that the universal remote control device is being charged;

determining a power level of a battery of the universal remote control device; and applying the over the air update based on the determination that the universal remote control device is being charged and the power level of the battery of the universal remote control device.

20. The non-transitory computer-readable storage medium of claim 19, wherein determining the over the air update includes evaluating extracted data associated with the group and accessing a central updates repository that is hosted on the external server infrastructure to determine the over the air update that applies to the group.

* * * * *